United States Patent
Winter et al.

(10) Patent No.: US 9,317,757 B2
(45) Date of Patent: Apr. 19, 2016

(54) METHOD AND APPARATUS FOR DETECTING A REAR VEHICLE LIGHT

(75) Inventors: Jan Winter, Berlin (DE); Dirk Feiden, Berlin (DE)

(73) Assignee: Hella KGaA Hueck & Co., Lippstadt (DE)

( * ) Notice: Subject to any disclaimer, the term of this patent is extended or adjusted under 35 U.S.C. 154(b) by 1148 days.

(21) Appl. No.: 13/378,572

(22) PCT Filed: Jun. 15, 2010

(86) PCT No.: PCT/EP2010/003776
§ 371 (c)(1),
(2), (4) Date: Mar. 26, 2012

(87) PCT Pub. No.: WO2010/145848
PCT Pub. Date: Dec. 23, 2010

(65) Prior Publication Data
US 2012/0176499 A1 Jul. 12, 2012

(30) Foreign Application Priority Data
Jun. 15, 2009 (DE) .......................... 10 2009 025 545

(51) Int. Cl.
*H04N 7/18* (2006.01)
*G06K 9/00* (2006.01)

(52) U.S. Cl.
CPC .................................. *G06K 9/00825* (2013.01)

(58) Field of Classification Search
CPC .................................................. G06K 9/00825
USPC ......................................................... 348/148
See application file for complete search history.

(56) References Cited

U.S. PATENT DOCUMENTS

| | | | | |
|---|---|---|---|---|
| 5,929,785 A | * | 7/1999 | Satonaka | 340/903 |
| 7,365,769 B1 | * | 4/2008 | Mager | 348/113 |
| 2002/0169538 A1 | * | 11/2002 | Yamamura et al. | 701/96 |
| 2003/0138133 A1 | * | 7/2003 | Nagaoka et al. | 382/104 |
| 2008/0165028 A1 | * | 7/2008 | Fechner et al. | 340/901 |

FOREIGN PATENT DOCUMENTS

| | | |
|---|---|---|
| DE | 102004056426 A1 | 5/2006 |
| EP | 1024050 A1 | 2/2000 |
| EP | 1024050 * | 8/2000 ............... B60Q 1/52 |

(Continued)

OTHER PUBLICATIONS

"Highway Scene Analysis from a Moving Vehicle under reduced visibility conditions", Betke et al., 1998 IEEE international conference on Intelligent Vehicle, Oct. 1998.*

(Continued)

*Primary Examiner* — Mohammed Rahaman
(74) *Attorney, Agent, or Firm* — Faegre Baker Daniels LLP

(57) ABSTRACT

A state of a rear vehicle light is detected. A camera system integrated in a vehicle generates an image of an environment in front of the vehicle. An evaluation unit connected to the camera system detects at least one vehicle contained in the image, defines an image range associated with said vehicle, and divides the image range into sub-ranges comprising at least a left sub-range and a right sub range. A segmentation of the sub-ranges into image segments is performed by way of the evaluation unit on the basis of brightness values of points contained in said sub-ranges. At least one brightest image segment is extracted from each of said sub-ranges, and the extracted image segments are checked for whether they can be associated with a particular vehicle light in an ON state.

14 Claims, 4 Drawing Sheets

(56) References Cited

FOREIGN PATENT DOCUMENTS

| JP | 08241500 | A | | 9/1996 | |
|----|----------|---|---|--------|---|
| JP | H08335300 | A | | 12/1996 | |
| JP | 2008265474 | A | | 11/2008 | |
| WO | WO2006089498 | A1 | | 8/2006 | |
| WO | WO 2009106162 | | * | 9/2009 | ............... G08G 1/16 |
| WO | WO2009106162 | A1 | | 9/2009 | |

OTHER PUBLICATIONS

"Brake Light detection by Image Segmentation", Tantalo et al., Dec. 2006, Department of Electrical Engineering and computer science.*

"11.5.1 Segmentation" In: I Masaki (Ed.): "Vision Based Vehicle Guidance" 1992, Springer Verlag, New York, US, pp. 242-245.*

Betke, et al., Highway Scene Analysis from a Moving Vehicle under Reduced Visibility Conditions, IEEE International Conference on Intelligent Vehicles, Oct. 28, 1998, 6 pgs.

International Search Report and Written Opinion for PCT/EP2010/003776, mailed Nov. 22, 2010, 16 pgs.

Schaaser et al., 11.5.1 Segmentation, In: I Masaki: Vision-Based Vehicle Guidance, 1992, 4 pgs.

Tantalo et al., Brake Light Detection by Image Segmentation, Department of Electrical Engineering and Computer Science, Dec. 17, 2006, 4 pgs.

* cited by examiner

METHOD AND APPARATUS FOR DETECTING A REAR VEHICLE LIGHT

FIELD OF THE INVENTION

The invention relates to a method for detecting a state of a rear vehicle light as well as to an apparatus suitable for detecting switched on vehicle lights of preceding vehicles.

BACKGROUND

Modern vehicles are increasingly being equipped with camera-based driver assistance systems which serve to assist the driver in driving the vehicle. In such camera-based driver assistance systems, images of an environment of the vehicle are detected in order, for instance, to measure distances from a road edge or to recognize traffic signs. While making use of this information on the environment of the vehicle, a correspondingly configured driver assistance system can, for example, warn the driver of an unintentional leaving of the lane by suitable signaling or also can actively intervene in the control of the vehicle, for example by an activation of brake lights on recognition of a situation which makes an early braking appear probable or necessary.

SUMMARY

A state of a rear vehicle light is detected in which a camera system integrated in a vehicle generates an image of an environment in front of the vehicle. An evaluation unit is connected to the camera system and detects at least one vehicle contained in the image. The evaluation unit also defines an image region of the image associated with this vehicle and divides the image region into part regions that include at least one left part region and one right part region. A respective segmentation of the part regions into image segments is carried out by means of the evaluation unit with reference to brightness values of pixels contained in these part regions. A respective at least one brightest image segment is extracted from each of these part regions and a check of the extracted image segments is carried out as to whether they can be associated with a specific vehicle light in a switched on state. The evaluation unit emits a signal associated with the state thus determined if this check has a positive result.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

DETAILED DESCRIPTION

Figure 1:
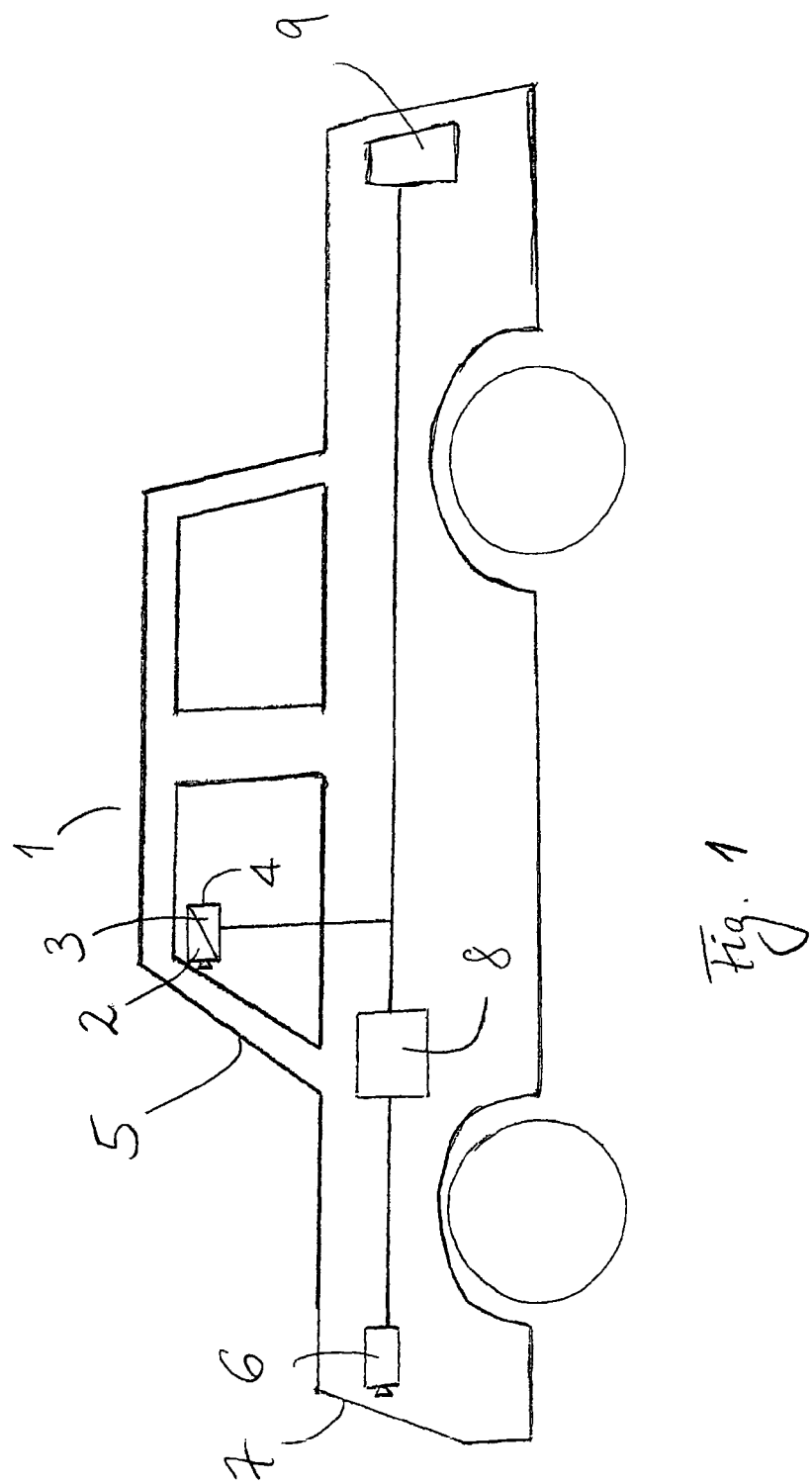
FIG. 1 a schematic representation of a vehicle which is equipped with an apparatus of the described kind.

A vehicle 1 is shown in FIG. 1 which is equipped with an apparatus for detecting lighting up brake light systems of preceding vehicles. This apparatus includes a camera system which comprises a grayscale camera 2 and a lidar sensor 3 which are both arranged in an integrated image detection unit 4 behind a front screen 5 of the vehicle 1 for detecting an environment in front of the vehicle 1. The apparatus further includes a radar sensor 6 which is arranged behind a radiator grill 7 of the vehicle 1. The apparatus further includes an evaluation unit 8 with which the components of the camera system and the radar sensor 6 are connected to transmit image data which are generated by the grayscale camera 2 and to transmit output signals of the radar sensor 6 and of the lidar sensor 3. The evaluation unit 8 is further connected to brake lights 9 of the vehicle 1 which in the present embodiment cannot only be controlled by depressing a brake pedal of the vehicle 1, but can also be controlled by means of the evaluation unit 8 to "pass on" a brake light of a preceding vehicle to the rear. The brake lights 9 here serve only as an example for a vehicle system which can be controlled in dependence on a detection of lighting up brake lights in front of the vehicle 1.

The functionality of the evaluation unit 5 will be described in detail with reference to FIGS. 2 and 3. The evaluation unit 8 is configured for generating and for outputting a brake light signal if a lighting up brake light system of a further vehicle preceding the vehicle 1 can be detected. This brake light signal can be transmitted to a brake light system of the vehicle 1 for actuating the brake lights 9 in the present special embodiment. The brake light signal is, however, as said, also usable for controlling other or additional controllable devices. The lidar sensor 4 and the radar sensor 6 are configured for generating image data of the environment in front of the vehicle 1 which in particular serve a recognition of vehicles present in this environment.

The grayscale camera 2 can in principle also be replaced with a color camera, but has the advantage with respect to it that it requires or generates a smaller data quantity per image than a color camera with the same or even better spatial resolution. The grayscale camera 2, the lidar sensor 3 and the radar sensor 6 can naturally also be realized in a construction manner separate from one another or can be combined with one another as desired in image detection units. Their arrangement within the vehicle is also any desired as long as it is ensured that images or image data of an environment in front of the vehicle 1 can be detected.

Figure 2:
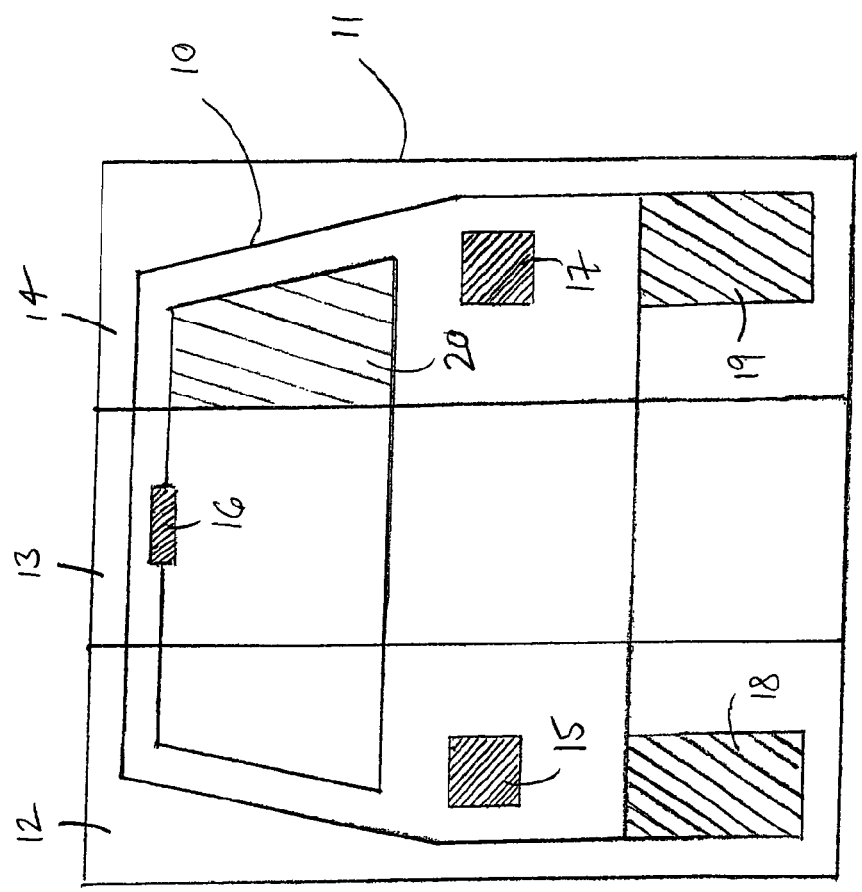
FIG. 2 a schematic representation of a division of a camera image generated using the apparatus into search regions.

An image of an environment in front of the vehicle 1 is shown schematically in FIG. 2 in which a further vehicle 10 is contained which precedes the vehicle 1. This image illustrates the operation of an apparatus for detecting braking light systems described with reference to FIG. 1. The image has been detected by a grayscale camera 2 of this apparatus and has been transmitted to an evaluation unit 8 contained in the apparatus.

This evaluation unit 8 is configured for detecting at least one vehicle 10 contained in the images, for defining an image region 11 belonging to this vehicle 10 and for dividing this image region into a left part region 12, a middle part region 13 and a right part region 14, wherein the evaluation unit 8 is additionally configured for generating a segmentation of the left part region 12, of the middle part region 13 and of the right part region 14 into image segments—also only called segments in the following—with reference to brightness values of pixels contained in these part regions. Some of these segments are shown by the surfaces 15 to 20 shown in FIG. 2, wherein 15 corresponds to a left rear light, 16 to a middle rear light, 17 to a right rear light, 18 and 19 respectively to a rear wheel and to a part of a rear window contained in the right part region 14. The individual segments are characterized on the basis of their definition with reference to brightness values—that is with reference to grayscales of the respective image generated with the grayscale camera 2—in that a largely constant—that is a not necessarily exactly constant—brightness value or grayscale value is present within each of these segments, whereas this brightness value or grayscale value significantly differs from a brightness value or grayscale value of a direct environment of the respective segment. In this respect, use can be made for segmentation of methods already sketched above by a corresponding programming of the evaluation unit 8.

Furthermore, the evaluation unit 8 is configured for extracting at least the respective brightest image segment—possibly also the respective two brightest image segments or the three brightest image segments—from each of these part regions 12, 13 and 14 which, in the case shown in FIG. 2, correspond in the left part region 12 to the left rear light 15, in the middle part region 13 to the middle rear light 16 and in the right part region 14 to the right rear light 17.

In addition, the evaluation unit 8 is configured for carrying out a check whether the image segment extracted from the left part region 12 and the image segment extracted from the right part region 14 are of the same size and lie at the same level and, if this is the case, whether the brightest image segment extracted from the middle part region 13 is located above the two segments extracted from the part regions 12 and 14 and is located centrally between the brightest segments from the left and right part regions 12 and 14 with respect to a horizontal coordinate. This is obviously the case in the situation shown in FIG. 2.

Finally, the evaluation unit 8 is configured for generating and outputting a brake light signal if this check has, as in the case shown here, a positive result. In the present embodiment, the brake lights 9 are controlled by this brake light signal.

For a particularly effective segmentation of the part regions 12, 13, and 14, the evaluation unit 8 is configured for defining rows within the part regions, with the rows comprising the pixels of these part regions and for breaking down these rows into row segments with reference to the brightness values of the pixels of these rows, with the image segments being generated by pooling row segments with adjacent pixels. In the present case, these rows extend horizontally from a left margin up to a right margin of the respective part region 12, 13 or 14. These rows furthermore extend parallel to one another and also parallel to an upper margin and to a lower margin of the part regions 12, 13 or 14. The definition of the rows can, however, equally well take place differently, for instance parallel to lateral margins of the respective part regions 12, 13, 14.

The evaluation unit 8 is advantageously also connected to the lidar sensor 4 and to the radar sensor 6 and is configured for detecting a vehicle 10 contained in the image with the aid of image data or of output signals of the lidar sensor 4 and/or of the radar sensor 6. In this manner, a particularly reliable detection of preceding vehicles is ensured.

Figure 3:
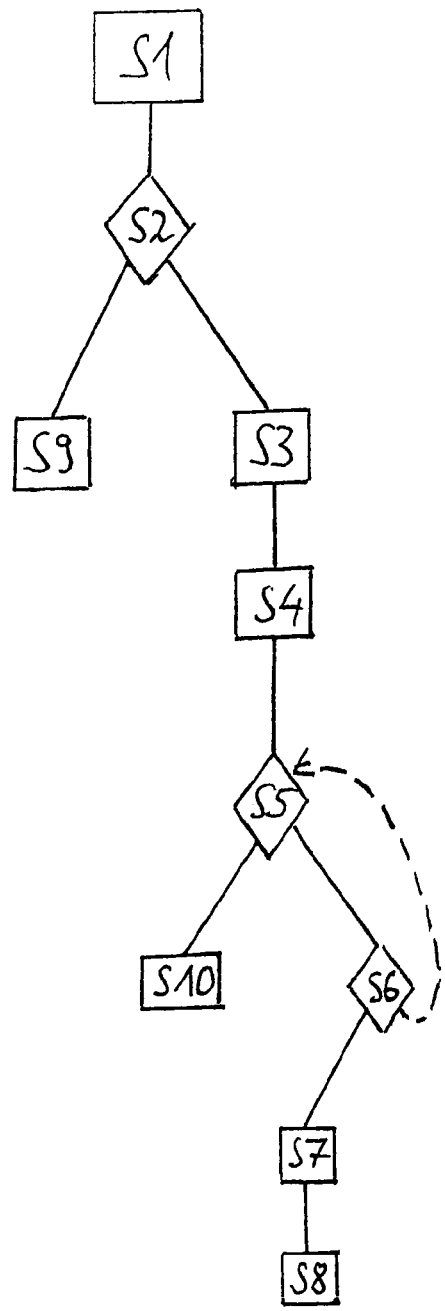
FIG. 3 a flowchart which illustrates the course of a method carried out using this apparatus for detecting a brake light system.

In FIG. 3, the method carried out using the described apparatus by means of the correspondingly programmed evaluation unit 4 is shown as a flowchart.

In a first step S1, an image of an environment in front of the vehicle 1 is first generated using the camera system and is transmitted to the evaluation unit 8 connected to the camera system. In this respect, the image data originate from the grayscale camera 2, from the lidar sensor 3 and from the radar sensor 6. In the evaluation unit 8, the image is searched for vehicles in step S2 by means of known image detection processes. If a vehicle contained in the image was detected, in step S3 an image region of this image associated with the vehicle is defined—in accordance with the image region 11 in the situation shown in FIG. 2—and the image region is divided into the left part region 12, into the middle part region 13 and into the right part region 14 and a segmentation of the left part region 12, of the middle part region 13 and of the right part region 14 respectively into image segments is carried out with reference to brightness values of pixels contained in these part regions 12, 13, 14.

In this respect, the segmentation of the left part region 12, of the middle part region 13 and of the right part region 14 into image segments is carried out in that rows of pixels contained in these part regions 12, 13, 14 are defined in each of these part regions 12, 13, 14 and the rows are broken down into row segments with reference to brightness values of these pixels, wherein the image segments are generated by pooling row segments of different rows which contain directly adjacent pixels.

In a subsequent step S4, the respective brightest image segment is extracted from each of these part regions 12, 13, 14—or at least also the respective two brightest image segments in the part regions 12 and 14. They are in particular the areas 15, 16 and 17 in the situation shown in FIG. 2. In this respect, an image segment is extracted when its brightness lies above a predefined limit value—and possibly additionally a size of the image segments lies above a threshold value. In step S5, a check is made—optionally pair-wise for all extracted image segments from the part regions 12 and 14—whether an extracted image segment of the left part region 12 and an extracted image segment of the right part region 14 are of the same size and are at the same level (i.e. height). In this respect, two sizes or two levels are treated as the same when they differ by values which are smaller than predefined limit values. If this check has a positive result, that is, if a pair of image segments is found whose sizes and levels are the same in this sense, a check is made in step S6 whether an extracted brightest image segment of the middle part region 13 exists which is located at an elevated central position between the image segments of the named pair. In this respect, a deviation from an exact central position is in turn compared with a corresponding defined limit value. If the check in S6 has a negative result, step S6 is optionally repeated for other pairs of extracted image segments.

If the check in S6 has a positive result, the already named brake light signal is generated in a further step S7. This brake light signal can be given in that a specific value is assigned to a variable defined in a programming of the evaluation unit 8. A desired function of a vehicle system can thereby in turn be triggered, for example a lighting up of the brake lights 9 of the vehicle 1 and possibly also of further controllable devices of the vehicle 1. The triggering of this function by the brake light signal generated in step S7 is illustrated in FIG. 3 as step S8.

If one of the steps S2 or S5 produces a negative result, this means that either no vehicle (step S9) or no brake light system step (S10) could be detected. In this case, the method is repeated starting at step 1.

The evaluation unit additionally allows the performing of a similar method by a corresponding programming, with said method being able to determine whether a turn indicator and/or hazard lights of a preceding vehicle is/are switched on.

Hypotheses on possible motor vehicles in the images delivered by the grayscale camera 2 are also prepared in this method on the basis of an object detection. These part images containing motor vehicle hypotheses are delivered to a turn indicator detection in a further processing step. Said turn indicator detection in turn divides the image into part regions 12, 13 and 14, with the left part region 12 and the right part region 14 serving as search regions. Characteristic features (based on grayscale, on edges, possibly also on color) are stored over time within these search regions. A pattern detection algorithm can now detect the presence of a characteristic frequency for turn indicators (1.5 Hz±0.5 Hz) in these features stored over time and can output it as information. The intended lane change of a preceding motor vehicle can thereby e.g. first be automatically detected. In addition, it can also be recognized whether the motor vehicle has activated the hazard lights, namely precisely when both turn indicators are active and flash in the same phase.

Figure 4:
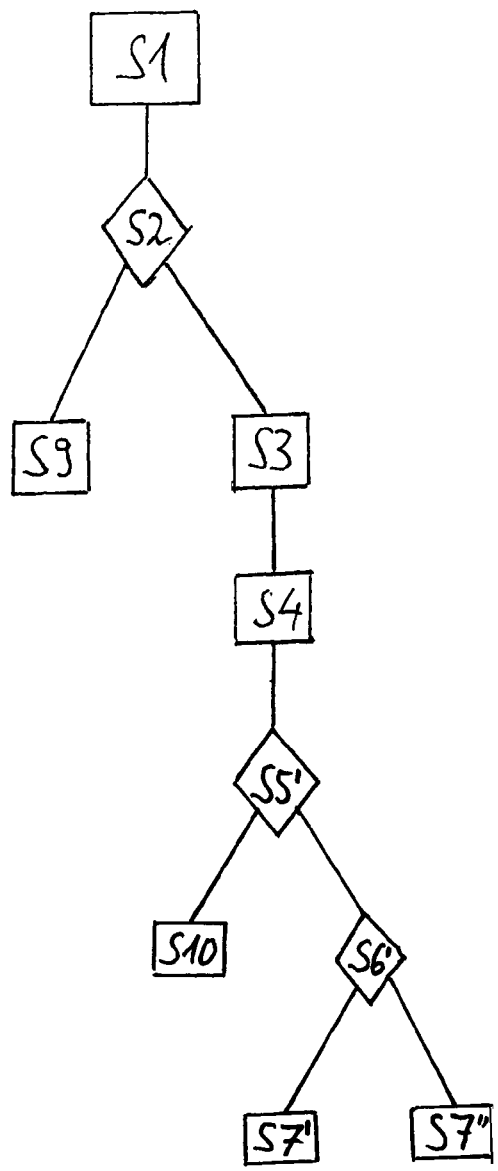
FIG. 4 in a representation corresponding to FIG. 3, another method which can be carried out using the described apparatus and with which a switched on turn indicator and switched on hazard lights of a preceding vehicle can be detected.

FIG. 4 illustrates this process in a manner corresponding to FIG. 3. Steps S1, S2, S3, S4 and S9 and S10 correspond to the steps of the previously described process designated in the same manner. In the steps S5' following step S4 here, time sequences of the brightness values of the extracted image segments are detected and checked as to whether they show a time periodicity of a frequency of between 1 Hz and 2 Hz. If this is not the case, a new start of the process is triggered by step S10. If, in contrast, such a periodicity is found, a further check step S6 is triggered in which a check is made whether the periodicity for the extracted image segment from the left part region 12 and the extracted image segment from the right part region 14 is the same and whether the time sequences of the brightness values of these image segments are synchronized. If this is not the case, a turn indicator signal is triggered by step ST which informs a driver assistance system of the vehicle 1 of a change in direction or of lane to be expected of the preceding vehicle. If, in contrast, the check carried out by the check step S6' is also positive, a hazard light signal is triggered by a step S7" by which the driver assistance system of the vehicle 1 receives the information that hazard lights of the preceding vehicle are switched on. As a consequence of this, an acoustic warning signal for the driver of the vehicle 1 can e.g. be triggered or hazard lights of the vehicle 1 can be automatically switched on. To make the process more reliable, provision can be made that the image segments are also checked in check step S6' as to whether the image segment extracted from the left image segment 12 and the image segment extracted from the right part region 14 are the same size and are at the same level. In this respect, all extracted image segments from the part regions 12 and 14 can naturally again be checked in the described manner and optionally compared pair-wise.

So that such driver assistance systems can react as well as possible to traffic situations, it is desirable if they can be supplied with information on rear vehicle lights of preceding vehicles, which can in particular include flashing lights used as turn indicators or hazard lights or brake lights. It is therefore the underlying object of the invention to propose a method with which a lighting up of a rear vehicle light of a preceding vehicle can be detected which should be able to be realized as simply as possible and which should manage with a processing of data quantities which are as small as possible. It is furthermore the underlying object of the invention to develop an apparatus for detecting rear vehicle lights of preceding vehicles which light up which can be realized with a correspondingly small effort and without processing unnecessarily large quantities of data.

This object is satisfied in accordance with the invention by a method having the features of the main claim and by an apparatus having the features of the independent claim as well as by a vehicle containing such an apparatus. Advantageous further developments and embodiments of the invention result from the features of the dependent claims.

A method is therefore proposed for detecting a state of a rear vehicle light in which a camera system integrated in a vehicle generates an image of an environment in front of the vehicle and an evaluation unit connected to the camera system detects at least one vehicle contained in the image, defines an image region of this image associated with this vehicle and divides the image region into part regions which include at least one left part region and one right part region, with a respective segmentation of the part regions into image segments being carried out by means of the evaluation unit with reference to brightness values in pixels (often also termed as image points or picture elements) contained in these part regions, with furthermore in each case at least one brightest image segment being extracted from each of these part regions and a check of the extracted image segments being carried out as to whether they can be associated with a specific vehicle light in a switched on state and with the evaluation unit emitting a signal associated with the state thus determined if this check has a positive result.

An automatic detection of rear vehicle lights lighting up can thereby be realized with a comparatively small effort, with the signal output in dependence thereon being able to trigger a warning function of a driver assistance systems or also to trigger a direct intervention in a vehicle control. In this respect, a segmentation is understood as a pooling (i.e. merging or combining) of adjacent picture points into image segments. In a point-wise segmentation, image segments can e.g. be formed from pixels whose brightness values differ from one another by less than a predefined threshold value.

A correspondingly advantageous apparatus for detecting a state of a rear vehicle light for use in a vehicle therefore has a camera system for detecting images of an environment in front of the vehicle and an evaluation unit, with the evaluation unit being configured to

- detect at least one vehicle contained in the images;
- define an image region belonging to this vehicle; and
- divide this image region into part regions which include at least one left part region and one right part region,
- carry out a segmentation of the part regions into image segments with reference to brightness values of pixels contained in these part regions;
- extract in each case at least one brightest image segment from each of these part regions;
- carry out a check of the extracted image segments as to whether they can be associated with a specific vehicle light in the switched on state; and
- generate a signal associated with the thus determined stated if this check has a positive result.

The method can e.g. be performed so that it allows a switched on turn indicator and/or switched on hazard lights to be detected. A time sequence of the brightness values in the image segments extracted from the left part region and from the right part region are then detected for the checking of the extracted image segments and is checked for time periodicity, with the signal which now indicates a switched on turn indicator or switched on hazard lights of a preceding vehicle being output when in so doing a periodicity having a frequency within a predefined frequency range is determined The predefined frequency range can in this respect e.g. be defined as a range corresponding to the interval of 1 Hz to 2 Hz or as a range containing this interval.

To be able to detect switched on hazard lights or to be able to distinguish them from a simple turn indicator, provision can be made in this respect that, on the check of the image segments, a check is further made in the event of the determination of a periodicity of the brightness values within the predefined frequency range whether the periodicity for the extracted image segment from the left part region and the extracted image segment from the right part region is the same and synchronized, with the signal being output as a signal indicating switched on hazard lights if this check has a positive result. The reliability can be increased in this respect if a check is further made on the check as to whether the extracted image segment from the left part region and the extracted image segment from the right part region are of the same size and are at the same level (i.e. height).

In a particularly advantageous embodiment, the method allows a lighting up of a brake light system to be detected. The image region is the preferably divided by the evaluation unit into the left part region, the right part region and a middle part region, with the image segments extracted from the part regions each being checked in the named check as to whether the extracted image segment from the left part region and the extracted image segment from the right part region are of the same size and are at the same level (i.e. height) and as to whether the brightest image segment from the middle part region is located higher and centrally between the brightest image segments from the left and right part regions, with the signal being output as a brake light signal if this check has a positive result.

In this embodiment, a storage of previously taken images is not necessary since the lighting up brake light system can also be detected without a tracking of a time sequence of brightness values. The data quantity to be processed and in particular to be buffered in the detection of brake light systems can therefore be kept small in that the generation of difference images is dispensed with and taken images are individually evaluated.

A particularly small data quantity is therefore generated in the proposed method of detecting brake light systems in which a camera system integrated in a vehicle generates an image of an environment in front of the vehicle and an evaluation unit connected to the camera system detects at least one vehicle contained in the image, defines an image region of the image associated with this vehicle and divides the image region into a left part region, into a middle part region and into a right part region,
  wherein a segmentation of the left part region, of the middle part region and of the right part region into images segments is carried out with reference to brightness values of pixels contained in these part regions by the evaluation unit;
  wherein in each case at least one brightest image segment is extracted from each of these part regions;
  wherein—if more than one brightest image segment is extracted from a part region, preferably pair-wise in each case for each of the extracted brightest image segments—a check is made whether the extracted image segment from the left part region and the extracted image segment from the right part region are of the same size and are at the same level (i.e. height) and whether the brightest image segment from the middle part region is located higher and centrally between the brightest image segments from the left part region and the right part region;

and a brake light signal is generated if this check has a positive result.

A corresponding apparatus for detecting brake light systems for use in a vehicle for carrying out this method is proposed, wherein the apparatus has a camera system for detecting images of an environment in front of the vehicle and an evaluation unit, and wherein the evaluation unit is configured for detecting at least one vehicle contained in the images, for defining an image region belonging to this vehicle and for dividing this image region into a left part region, into a middle part region and into a right part region, wherein the evaluation unit is moreover configured
  to carry out a segmentation of the left part region, of the middle part region and of the right part region into image segments with reference to brightness values of pixels contained in these part regions;
  to extract in each case at least one brightest image segment from each of these part regions,
  for a check—optionally again to be carried out pair-wise for all of the extracted brightest image segments—as to whether the extracted image segment from the left part region and the extracted image segment from the right part region are of the same size and lie at the same level (i.e. height) and as to whether the brightest image segment from the middle part region is located higher and centrally between the brightest image segments from the left part region and the right part region;
  and to generate a brake light signal if this check has a positive result.

In addition, a vehicle is proposed which is equipped with an apparatus in accordance with the invention, with the camera system expediently being directed to an environment in front of the vehicle.

In the possible case that the vehicle detected in the image is tilted about a longitudinal axis with respect to the vehicle equipped with the apparatus—e.g. due to a road whose course has a changing lateral inclination—the mentioned check of two image segments extracted from the right part region and from the left part region as to whether they are at the same level (i.e. height) should preferably be carried out with respect to a plane defined by the vehicle recognized in the image. The height should therefore be defined with respect to a plane—imaged on a more or less horizontal line in the image—with respect to which the vehicle detected in the image is not tilted.

A particularly reliable detection of brake light systems is achieved if the segmentation of the left part region, of the middle part region and of the right part region into image segments is carried out edge-wise. It can, however, equally well also be carried out point-wise. It is particularly advantageous if the segmentation takes place row-wise—or analogously column-wise—in that therefore first rows (or columns) of pixels contained in each of these part regions are defined in these part regions and the rows (or columns) are then broken down by brightness values of these pixels into row segments (column segments), with the image segments being generated by pooling row segments (column segments) with adjacent pixels. In this respect, the segmentation of the rows advantageously takes place edge-wise in every row, but can in principal also take place point-wise. In this respect, a segmentation is called edge-wise in which image edges are detected and image segments are defined as areas within closed edge series (i.e. within closed paths composed of series of edges). Borders between the image segments are then therefore defined where brightness edges are detected, with a brightness edge being able to be defined as a point at which a brightness jump or a brightness change of a defined minimum amount occurs with a minimum gradient or with an extent bounded within a spatial interval.

In a simple embodiment of the method, it may be sufficient if respectively precisely one brightest image segment, that is the actually brightest image segment, is extracted in all three part regions and a check is made in the described manner whether it can be a switched on arrangement of three brake lights together with the brightest images regions from the other part regions. It is, however, also conceivable only to extract precisely one brightest image segment in the middle part segment, but to extract the respective two or three brightest image segments—that is the brightest and the second brightest image segment or the brightest, the second brightest and the third brightest image segment—in the left part region and in the right part region. If then the described check is carried out pair-wise for all extracted image segments from the right part region and the left part region, the method can also reliably detect the lighting up of a brake light system having three brake lights if one of the brake lights should be exceeded in brightness, for example, by a likewise switched on rear fog lamp and/or a flashing light.

The camera system used to generate the image can be an optical image sensor designed as desired within large limits or can be a system including such an image sensor. In this respect, the use of a grayscale camera, that is, of a grayscale image sensor, is of advantage with respect to the processing of a data quantity which is as small as possible. To improve the detection of a vehicle contained in the image with respect to its reliability, image data of a lidar sensor connected to the evaluation unit can additionally also be processed in the evaluation unit to detect a vehicle—or a hypothetical vehicle—and thereby to help define the image region in which the preceding vehicle can be presumed which is then divided into three part regions in the manner described. In addition or alternatively, measured data of a radar system can also be used for this purpose.

In an advantageous further development of the method, the brake light signal is used for a control of a controllable device, for instance of a brake light system or of another vehicle system.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations that fall within the scope of the claims, together with all equivalents thereof.

The invention claimed is:

1. A method for detecting a state of a rear vehicle light, wherein the rear vehicle light comprises a switched on turn indicator and/or switched on hazard lights, and wherein the method comprises:
  receiving an image of an environment in front of a vehicle;
  detecting at least one vehicle contained in the image;
  defining an image region of the image associated with the at least one vehicle;
  dividing the image region into part regions that include at least one left part region and at least one right part region;
  segmenting the left and right part regions into image segments based on brightness values of pixels contained in the left and right part regions;
  extracting at least one brightest image segment from each of the left and right part regions;
  analyzing the extracted image segments as to whether they can be associated with the rear vehicle light in a switched on state;
  extracting a time sequence of the at least one brightest image segment from the left part region and right part region;
  analyzing a time periodicity of the at least one brightest image segment from the left part region and right part region; and
  generating a signal if the rear vehicle light is in the switched on state and if the periodicity has a frequency within a predefined frequency range,
  wherein the method further comprises:
  comparing the extracted time sequence of the at least one brightest image segment from the left part region with the extracted image time sequence of the at least one brightest image segment from the right part region; and
  generating a signal to indicate that the hazard lights are switched on if the extracted time sequence of the at least one brightest image segment from the left and right part regions are synchronized,
  wherein the left and right part regions include rows of pixels, and wherein the segmenting comprises:
    defining rows of pixels in the left and right part regions, wherein each pixel includes a brightness value;
    sorting the rows of pixels into row segments based on the brightness values of the pixels such that each row segment includes pixels of substantially similar brightness values; and
    generating image segments by pooling mutually contacting row segments of adjacent rows of pixels in the left and right part regions.

2. The method of claim 1, wherein the at least one brightest image segment is only extracted when brightness values of pixels of the at least one brightest image segment exceed a threshold brightness value.

3. The method of claim 1, wherein the segmentation step comprises:
  defining limits between the image segments where brightness edges are detected.

4. The method of claim 1, wherein the detecting step comprises:
  detecting at least one vehicle with image data from a lidar sensor or of a radar sensor.

5. The method of claim 1, and further comprising:
  controlling at least one controllable device with the signal.

6. The method of claim 1, wherein the predefined frequency range has a frequency in the range of about 1 Hz to about 2 Hz.

7. The method of claim 1, and further comprising:
  determining whether the extracted image segment from the left part region and the extracted image segment from the right part region are of the same size and are at the same level.

8. A method for detecting a state of a rear vehicle light, wherein the rear vehicle light comprises a brake light, and wherein the method comprises:
  receiving an image of an environment in front of a vehicle;
  detecting at least one vehicle contained in the image;
  defining an image region of the image associated with the at least one vehicle;
  dividing the image region into part regions that include at least one left part region, one right part region, and one middle part region;

segmenting the left, right, and middle part regions into image segments based on brightness values of pixels contained in the left, right, and middle part regions, respectively;

extracting at least one brightest image segment from each of the left, right, and middle part regions;

analyzing the extracted image segments as to whether they can be associated with the rear vehicle light in a switched on state; and generating a signal if the rear vehicle light is in the switched on state and if (a) the at least one brightest image segment from the left part region and the at least one brightest image segment from the right part region are of the same size and are at the same level and (b) the at least one brightest image segment from the middle part region is located higher and centrally between the at least one brightest image segments from the left and right part regions, wherein the left and right part regions include rows of pixels, and wherein the segmenting comprises:
defining rows of pixels in the left and right part regions, wherein each pixel includes a brightness value;
sorting the rows of pixels into row segments based on the brightness values of the pixels such that each row segment includes pixels of substantially similar brightness values; and
generating image segments by pooling mutually contacting row segments of adjacent rows of pixels in the left and right part regions.

9. The method of claim 8, wherein one brightest image segment is extracted in the middle part segment and one or two or three brightest image segments are extracted in each of the left and right part regions.

10. A system for detecting a state of a rear vehicle light, wherein the rear vehicle light comprises a switched on turn indicator and/or switched on hazard lights, and wherein the system comprises:
a camera system integrated in a vehicle configured to generate an image of an environment in front of the vehicle; and
an evaluation unit connected to the camera system, the evaluation unit configured to:
detect at least one vehicle contained in the image;
define an image region of the image associated with this vehicle;
divide the image region into part regions that include at least one left part region and one right part region;
segment the left and right part regions into image segments based on brightness values of pixels contained in the left and right part regions;
extract at least one brightest image segment from each of the left and right part regions;
analyze the extracted image segments as to whether they can be associated with the rear vehicle light in a switched on state;
extract a time sequence of the at least one brightest image segment from the left part region and right part region;
analyze a time periodicity of the at least one brightest image segment from the left part region and right part region; and
generate a signal if the rear vehicle light is in the switched on state and if the periodicity has a frequency within a predefined frequency range,
wherein the evaluation unit is further configured to:
compare the extracted time sequence of the at least one brightest image segment from the left part region with the extracted image time sequence of the at least one brightest image segment from the right part region; and
generate a signal to indicate that the hazard lights are switched on if the extracted time sequence of the at least one brightest image segment from the left and right part regions are synchronized,
wherein, to segment the left and right part regions into image segments, the evaluation unit is configured to:
define rows of pixels in the left and right part regions, wherein each pixel includes a brightness value;
sort the rows of pixels into row segments based on the brightness values of the pixels such that each row segment includes pixels of substantially similar brightness values; and
generate image segments by pooling mutually contacting row segments of adjacent rows of pixels in the left and right part regions.

11. The system of claim 10, and further comprising:
a lidar sensor and/or a radar sensor connected to the evaluation unit and configured to provide image data to the evaluation unit for the detection of the at least one vehicle contained in the image.

12. The system of claim 10, wherein the evaluation unit is connected to at least one device controllable by the generated signal.

13. The system of claim 10, wherein the camera system comprises a grayscale camera to generate grayscale images.

14. A system for detecting a state of a rear vehicle light, wherein the rear vehicle light comprises a brake light, and wherein the system comprises:
a camera system integrated in a vehicle configured to generate an image of an environment in front of the vehicle; and
an evaluation unit connected to the camera system, wherein the evaluation unit is configured to:
detect at least one vehicle contained in the image;
define an image region of the image associated with this vehicle;
divide the image region into part regions that include at least one left part region, one right part region, and one middle part region;
segment the left, right, and middle part regions into image segments based on brightness values of pixels contained in the left, right, and middle part regions, respectively;
extract at least one brightest image segment from each of the left, right, and middle part regions;
analyze the extracted image segments as to whether they can be associated with the rear vehicle light in a switched on state; and
generate a signal if the rear vehicle light is in the switched on state and if (a) the at least one brightest image segment from the left part region and the at least one brightest image segment from the right part region are of the same size and are at the same level and (b) the at least one brightest image segment from the middle part region is located higher and centrally between the at least one brightest image segments from the left and right part regions,
wherein, to segment the left and right part regions into image segments, the evaluation unit is configured to:
define rows of pixels in the left and right part regions, wherein each pixel includes a brightness value;
sort the rows of pixels into row segments based on the brightness values of the pixels such that each row segment includes pixels of substantially similar brightness values; and generate image segments by pooling mutually contacting row segments of adjacent rows of pixels in the left and right part regions.

* * * * *